Patented Sept. 11, 1951

2,567,912

UNITED STATES PATENT OFFICE 2,567,912

HETEROCYCLIC QUATERNARY AMMONIUM COMPOUNDS

James M. Sprague, Drexel Hill, Pa., assignor to Sharp & Dohme, Incorporated, Philadelphia, Pa., a corporation of Maryland No Drawing. Application July 17, 1950, Serial No. 174,360

7 Claims. (Cl. 260—286)

This invention is concerned with certain new and useful quaternary ammonium compounds. It is more particularly concerned with compounds represented by the general formula:

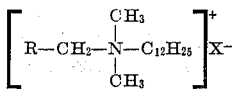

in which X is an anion and R is chosen from the group consisting of

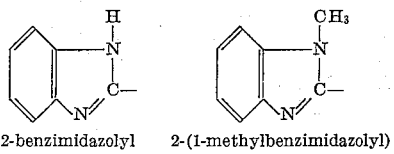

2-benzimidazolyl    2-(1-methylbenzimidazolyl)

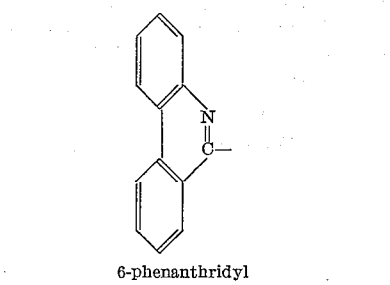

6-phenanthridyl

The compounds of this invention are prepared by the reaction of an alkyl halide and an appropriate tertiary amine. In general, equivalent quantities of an alkyl halide represented by the formula $RCH_2Cl$ and dodecyl-dimethylamine are allowed to react at room temperatures to yield the desired quaternary ammonium chloride.

It has been discovered as a feature of this invention that the compounds represented by the above set out formula possess superior antibactericidal properties. This is evidenced by their inhibition of the growth of bacteria in dilute concentrations, compared to structurally related compounds.

Since the antibacterial properties of the compounds of this invention reside in the quaternary ammonium portion of the molecule, it is to be understood that a wide variety of anions is embraced by the term X in the general formula. These anions can be varied at will with little or no effect on the antibacterial properties of the compounds. For example, X can be chloride, iodide, bromide, sulfate, phosphate, benzoate, acetate, propionate, or, in general, any of the anions usually occurring in combination with quaternary ammonium cations. Preferably the compounds are used in the form of their halides.

The antibacterial properties of the compounds of this invention are useful in such procedures as the sterilization of implements, such as surgical or dental implements, and also find utility for application to the skin as an antiseptic and as a component of mouth washes, gargles, and the like. The compounds are most conveniently used in solution.

The invention is illustrated by, but not necessarily restricted to, the following examples:

*Example 1.—Preparation of dimethyl-dodecyl-(2-benzimidazolylmethyl) ammonium chloride.* 0.75 g. (0.0045 mole) of 2-benzimidazolyl methyl chloride and 0.96 g. (0.0045 mole) dodecyldimethylamine were mixed together in a small Erlenmeyer flask and allowed to stand overnight. The reaction mixture was then dissolved in 3A alcohol (5% methyl alcohol and 95% ethyl alcohol) in order to allow complete reaction to occur. After standing overnight the reaction mixture was heated together with a small quantity of Norit decolorizing charcoal and the charcoal removed by filtration. The 3A alcohol was removed under vacuum and the residue recrystallized from a mixture of isopropyl ether and benzene. Subsequent recrystallization of the material from a combination of ethyl acetate and isopropyl ether yielded dimethyl-dodecyl-(2-benzimidazolylmethyl) ammonium chloride, M. P. 102.5–104° C.

*Example 2.—Preparation of dimethyl-dodecyl-[2 - (1 - methylbenzimidazolylmethyl)] - ammonium chloride.* 5.0 grams (0.028 mole) 2-(1-methylbenzimidazolylmethyl) chloride, 50 ml. absolute ethyl acetate, and 5.97 grams (0.028 mole) dodecyldimethylamine were mixed together in a 200 ml. three-necked round bottom flask equipped with a reflux condenser and mechanical stirrer. The mixture was stirred while heating on a steam bath for approximately 10 minutes. The flask was removed from the steam bath and stirring discontinued. The solution was allowed to stand at room temperature for approximately 3 hours. At the end of this time, a large crop of crystals had been deposited from the solution. The crystals were separated from the solution by filtration, washed with small portions of absolute ethyl acetate until all color was removed, and then recrystallized from boiling absolute ethyl acetate. There was obtained dimethyl-dodecyl-[2 - (1-methylbenzimidazolylmethyl)] - ammonium chloride, M. P. 122–123° C.

*Example 3.—Preparation of dimethyl-dodecyl-(6-phenanthridylmethyl)-ammonium chloride.* 2.27 grams (0.01 mole) 6-phenanthridylmethyl chloride and 2.13 grams (0.01 mole) dodecyldimethylamine were mixed together in a small Erlenmeyer flask together with enough acetone to produce a solution. The flask was stoppered and the mixture allowed to stand at room temperature for approximately two days. During this time, a colorless solid separated from the solution. The solid was collected on a filter and recrystallized first from acetone, then from absolute ethyl acetate, and finally from a mixture of benzene and ether. There was obtained dimethyl - dodecyl - (6-phenanthridylmethyl) - ammonium chloride, M. P. 77–79° C.

*Example 4.—Preparation of dimethyl-dodecyl-(2-benzimidazolylmethyl)ammonium hydroxide.* A water solution of dimethyl-dodecyl-(2-benzimidazolylmethyl)ammonium chloride (obtained as in Example 1) was made basic with dilute sodium hydroxide. There was produced a white precipitate which was recovered from the solution by filtration and dried. On recrystallization from absolute ethyl acetate there was obtained dimethyl-dodecyl- (2-benzimidazolylmethyl) ammonium hydroxide, M. P. 120–121° C.

Starting with this quaternary ammonium hydroxide it is possible to prepare any desired salt by the simple reaction of the quaternary ammonium hydroxide and an equivalent amount of acid. For example, the reaction of dimethyl-dodecyl - (2 - benzimidazolylmethyl) ammonium hydroxide with sulfuric acid, yields dimethyl-dodecyl - (2 - benzimidazolylmethyl) ammonium sulfate. Similarly, acids such as acetic, propionic, benzoic, phosphoric, hydrobromic and the like yield their respective salts.

*Example 5.—Preparation of dimethyl-dodecyl-[2-(1 - methylbenzimidazolylmethyl)]-ammonium hydroxide.* A relatively concentrated water solution of dimethyl-dodecyl-[2-(1-methyl-benzimidazolylmethyl)]-ammonium chloride (obtained as in Example 2) was treated with a molecular excess of silver oxide. The resulting silver chloride and excess silver oxide was separated from the solution by filtration. There was obtained dimethyl-dodecyl-[2-(1-methylbenzimidazolylmethyl)]-ammonium hydroxide.

Similarly, using the above procedure there is obtained from dimethyl-dodecyl-(6-phenanthridylmethyl)-ammonium chloride, the compound dimethyl - dodecyl - (6 - phenanthridylmethyl) - ammonium hydroxide.

Further, it is possible to obtain any desired salt of these compounds by the simple reaction of the quaternary ammonium hydroxide and an equivalent amount of acid as described above in Example 4.

It is to be noted that all the melting points are uncorrected and that they may vary with the rate of heating and the temperature of the bath when the sample is inserted.

What is claimed is:

1. A compound of the general formula:

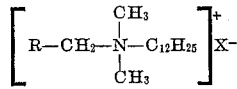

in which R is chosen from the group consisting of the 2 - benzimidazolyl,2-(1-methylbenzimidazolyl), and 6-phenanthridyl radicals and X is an anion.

2. Dimethyl - dodecyl-(2-benzimidazolylmethyl) ammonium halides.

3. Dimethyl - dodecyl - [2-(1-methylbenzimidazolylmethyl)]-ammonium halides.

4. Dimethyl - dodecyl - (6-phenanthridyl) ammonium halides.

5. Dimethyl - dodecyl-(2-benzimidazolylmethyl) ammonium chloride.

6. Dimethyl - dodecyl - [2-(1-methylbenzimidazolylmethyl)]-ammonium chloride.

7. Dimethyl - dodecyl - (6-phenanthridyl) ammonium chloride.

JAMES M. SPRAGUE.

No references cited.